United States Patent
Tsai et al.

(10) Patent No.: US 9,318,040 B1
(45) Date of Patent: Apr. 19, 2016

(54) DISPLAY PANEL

(71) Applicant: AU Optronics Corp., Hsin-Chu (TW)

(72) Inventors: Ai-Ju Tsai, Hsin-Chu (TW); Ming-Hsien Lee, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 3 days.

(21) Appl. No.: 14/564,099

(22) Filed: Dec. 9, 2014

(30) Foreign Application Priority Data

Nov. 10, 2014 (TW) .............................. 103138928 A

(51) Int. Cl.
*G09G 3/20* (2006.01)
(52) U.S. Cl.
CPC ...... *G09G 3/2003* (2013.01); *G09G 2300/0465* (2013.01); *G09G 2320/02* (2013.01)
(58) Field of Classification Search
CPC .............. G09G 2300/0465; G09G 2300/0452; G09G 3/3607; G09G 3/2003
See application file for complete search history.

(56) References Cited

U.S. PATENT DOCUMENTS

| | | | |
|---|---|---|---|
| 5,751,272 A * | 5/1998 | Silverbrook | ...... G02F 1/133514 345/694 |
| 6,972,824 B2 | 12/2005 | Masutani | |
| 7,511,778 B2 | 3/2009 | Baek | |
| 7,697,101 B2 | 4/2010 | Hong | |
| 7,796,226 B2 | 9/2010 | Yamada | |
| 8,253,913 B2 | 8/2012 | Tak | |
| 2003/0131030 A1* | 7/2003 | Sebot | ..................... G06F 9/3013 708/209 |
| 2004/0201811 A1 | 10/2004 | Jun | |
| 2010/0157228 A1 | 6/2010 | Sakurai | |
| 2010/0314622 A1* | 12/2010 | Kuo | ..................... G02F 1/13624 257/59 |

FOREIGN PATENT DOCUMENTS

| | | |
|---|---|---|
| CN | 201984263 U | 9/2011 |
| JP | 534679 | 2/1993 |
| JP | 922026 | 1/1997 |
| TW | 200513729 | 4/2005 |

* cited by examiner

*Primary Examiner* — Ricardo L Osorio
(74) *Attorney, Agent, or Firm* — Winston Hsu; Scott Margo

(57) ABSTRACT

A display panel includes a plurality of sub-pixels, scanning lines and data lines. The sub-pixels are disposed on a first substrate and include a plurality of rows and columns, and each sub-pixel of a first row of two adjoining rows is shifted by a predetermined distance along a first direction with respect to each sub-pixel of a second row of two adjoining rows. The scanning lines extend in the first direction and corresponding to the sub-pixels of the rows respectively. Each data line includes a plurality of first data segments and second data segments connected alternately. The first data segment extends along a second direction and partially overlaps the scanning line in a vertical direction. Each second data segment is disposed on one side of the scanning line, and at least a portion of the second data segments extends along a third direction different from the first and second directions.

14 Claims, 5 Drawing Sheets

DISPLAY PANEL

BACKGROUND OF THE DISCLOSURE

1. Field of the Disclosure

The present disclosure is related to a display panel, and more particularly, to a display panel with high aperture ratio and low parasitic capacitance.

2. Background of the Disclosure

Referring to FIG. 1, FIG. 1 is a schematic diagram illustrating a conventional display panel. As shown in FIG. 1, the conventional display panel 1 includes a substrate 10, and a plurality of scanning lines SL and data lines DL disposed on the substrate 10 defining a plurality of sub-pixels 12. The sub-pixels 12 are arranged in a stripe pattern including a plurality of rows and columns. The sub-pixels 12 includes a plurality of red sub-pixels 12R, green sub-pixels 12G and blue sub-pixels 12B, where the red sub-pixels 12R, the green sub-pixels 12G and the blue sub-pixels 12B are repeatedly arranged in order in the row direction, and the sub-pixels 12 of the same column have the same color. For example, the sub-pixels 12 of the first column, the fourth column . . . , and the $3N-2^{th}$ column are red sub-pixels 12R; the sub-pixels 12 of the second column, the fifth column . . . , and the $3N-1^{th}$ column are green sub-pixels 12G; and the sub-pixels 12 of the third column, the sixth column . . . , and the $3N^{th}$ column are blue sub-pixels 12B, where N is an positive integer greater than 0.

The size of the sub-pixel 12 of the conventional display panel 1, however, cannot be further reduced based on current process limit and design rule, which is no longer able to meet the requirement for high resolution display products. In addition, when displaying circular zone plate (CPZ) pattern, light halo phenomenon will occur, particularly in high frequency zone where the gap between circular patterns is smaller. Most importantly, color deviation i.e. color shift will occur when light halo phenomenon gets serious, which deteriorates display effect.

SUMMARY OF THE DISCLOSURE

In one aspect, a display device with high aperture ratio and low parasitic capacitance is provided.

According to an exemplary embodiment, a display panel is provided. The display panel includes a first substrate, a plurality of sub-pixels, a plurality of scanning lines, a plurality of data lines, second substrate and a display medium layer. The sub-pixels are disposed on the first substrate and arranged in an array having a plurality of rows and columns. The sub-pixels of each of the rows are arranged in a first direction, and the sub-pixels of each of the columns are arranged in a second direction, wherein the first direction and the second direction substantially intersect, and each of the sub-pixels of a first row of two adjoining rows is shifted by a predetermined distance along the first direction with respect to each of the sub-pixels of a second row of the two adjoining rows. The scanning lines are disposed on the first substrate, wherein the scanning lines extend along the first direction and are disposed corresponding to the sub-pixels of the rows respectively. The data lines are disposed on the first substrate and corresponding to the sub-pixels of the columns respectively, wherein the data lines and the scanning lines intersect, each of the data lines comprises a plurality of first data segments and a plurality of second data segments, each first data segment and each second data segment are alternately connected to one another, the first data segments extend along the second direction and partially overlap the scanning lines in a vertical direction, each of the second data segments is disposed on one side of one corresponding scanning line, at least a portion of the second data segments extend along a third direction different from the first direction and the second direction, the third direction and the second direction have an included angle greater than 0 degree and less than 90 degrees. The second substrate is disposed on the first substrate. The display medium layer is interposed between the first substrate and the second substrate.

The staggered arrangement between the sub-pixels of two adjacent rows is able to avoid light halo phenomenon when displaying high frequency zone of circular zone plate (CPZ) pattern and avoid color deviation (color shift) problem. In addition, the obliquely-disposed second data segment is able to reduce the parasitic capacitance between the data line and the scanning line while the aperture ratio is unaffected or even increased. Accordingly, the display quality is improved.

These and other aspects of the present disclosure will no doubt become obvious to those of ordinary skill in the art after reading the following detailed description of the preferred embodiment that is illustrated in the various figures and drawings.

DETAILED DESCRIPTION

To provide a better understanding of the disclosure to the skilled users in the technology of the disclosure, exemplary embodiments will be detailed as follows. The exemplary embodiments of the disclosure are illustrated in the accompanying drawings with numbered elements to elaborate the contents and effects to be achieved.

Figure 2:
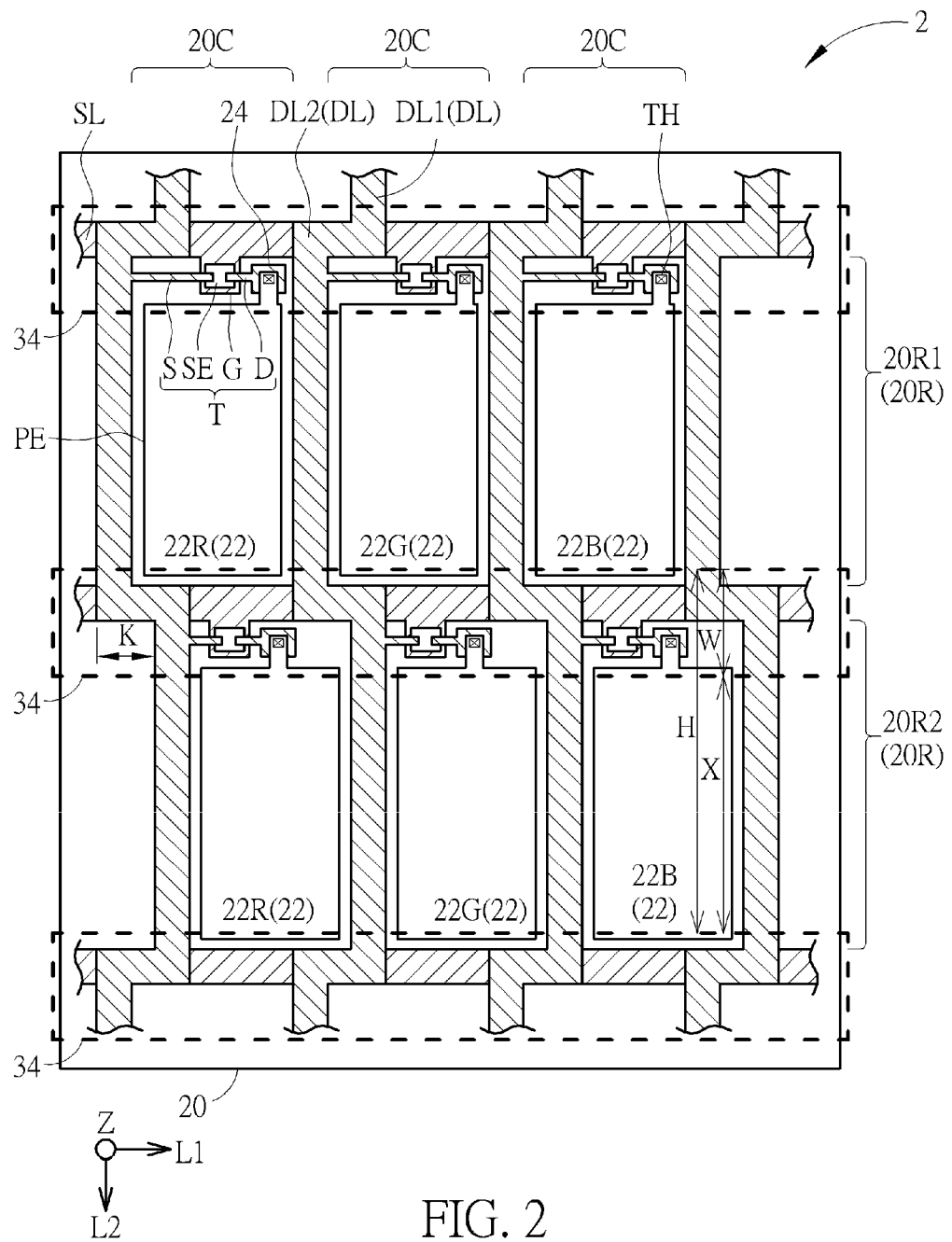
FIG. 2 is a top view diagram illustrating a display panel according to a first exemplary embodiment.
Figure 3:
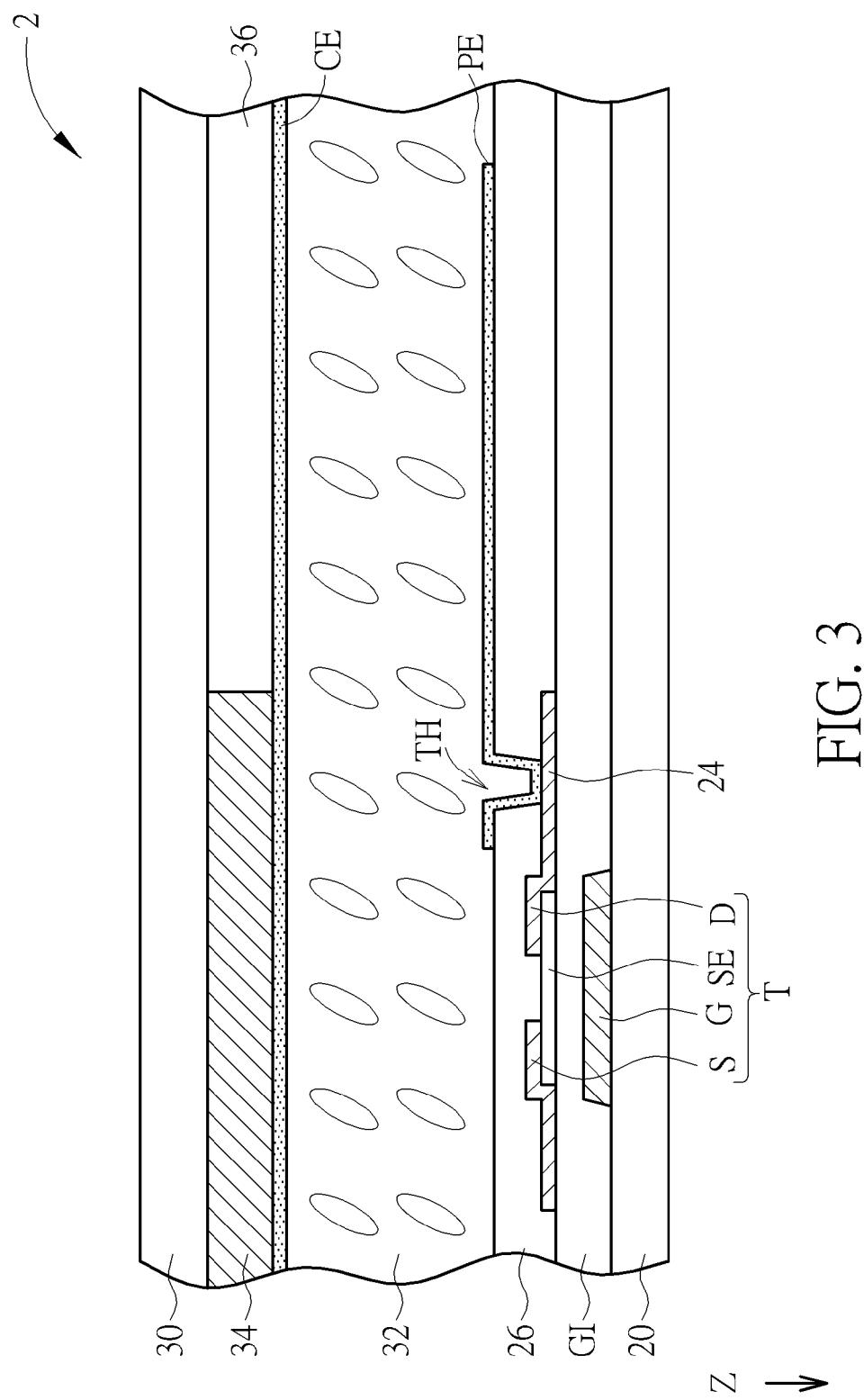
FIG. 3 is a cross-sectional view illustrating a display panel according to a first exemplary embodiment.

Referring to FIGS. 2-3, FIG. 2 is a top view diagram illustrating a display panel according to a first exemplary embodiment, and FIG. 3 is a cross-sectional view illustrating a display panel according to a first exemplary embodiment. As shown in FIGS. 2-3, the display panel 2 of this exemplary embodiment includes a first substrate 20, a plurality of scanning lines (also referred to as gate lines), a plurality of data lines DL, a second substrate 30 and a display medium layer 32. The first substrate 20 may include a transparent substrate e.g. a glass substrate, a plastic substrate or a quartz substrate, but not limited thereto. The first substrate 20 may be a rigid substrate (firm substrate) or a flexible substrate (bendable substrate). A plurality of sub-pixels 22 are disposed as a pixel array on the first substrate 20, and the pixel array are arranged in at least a plurality of rows 20R and a plurality of columns 20C. The sub-pixels 22 of each row 20R are arranged along a first direction L1, and the sub-pixels 22 of each column 20C are arranged along a second direction L2, where the first direction L1 and the second direction L2 substantially intersect. In this exemplary embodiment, the first direction L1 and the second direction L2 are substantially perpendicular, for example the first direction L1 is a latitudinal direction in FIG. 2, and the second direction L2 is a longitudinal direction in FIG. 2, but not limited thereto. In an alternative embodiment, the first direction L1 may be a longitudinal direction in FIG. 2, and the second direction L2 may be a latitudinal direction in FIG. 2. In still another alternative embodiment, the first direction L1 and the second direction L2 are not perpendicular to each other. When the first direction L1 is a latitudinal direction and the second direction L2 is a longitudinal direction in FIG. 2, each of the sub-pixels 22 of a first row 20R1 of two adjoining rows (or namely two neighboring rows) 20R is shifted by a predetermined distance K along the first direction L1 with respect to each of the sub-pixels 22 of a second row 20R2 of the two adjoining rows 20R, i.e. the sub-pixels 22 of any two adjoining rows 20R are staggeredly arranged. In this exemplary embodiment, the predetermined distance K is less than the width of the sub-pixel 22 in the first direction L1, for example, the predetermined distance K is preferably greater than 0 and less than or about equal to half of the width of the sub-pixel 22 in the first direction L1, but not limited thereto. The sub-pixels 22 may include a plurality of red sub-pixels 22R, green sub-pixels 22G and blue sub-pixels 22B. The red sub-pixels 22R, the green sub-pixels 22G and the blue sub-pixels 22B of each row 20R may be repeatedly arranged in order, and the sub-pixels 22 of the same column 20C have the same color. For example, the sub-pixels 22 of the first column, the fourth column . . . , and the $3M-2^{th}$ column are red sub-pixels 22R; the sub-pixels 22 of the second column, the fifth column . . . , and the $3M-1^{th}$ column are green sub-pixels 22G; the sub-pixels 22 of the third column, the sixth column . . . , and the $3M^{th}$ column are blue sub-pixels 22B, where M is an positive integer greater than 0. The scanning lines SL are disposed on the first substrate 20, and the scanning lines SL extend along the first direction L1 and are disposed corresponding to the sub-pixels 22 of the rows 20R respectively. The data lines DL are disposed on the first substrate 20 and corresponding to the sub-pixels 22 of the columns 22C respectively, where the scanning lines SL and the data lines DL intersect (or namely cross). In addition, each of the data lines DL includes a plurality of first data segments (also referred to as first data section or first data portion) DL1 and a plurality of second data segments (also referred to as second data section or second data portion) DL2, and each first data segment DL1 and each second data segment DL2 are alternately and structurally connected to one another (or namely each other). Specifically, the first data segments DL1 extend along the second direction L2 and partially overlap the scanning lines SL in a vertical direction (vertical projection direction) Z; each of the second data segments DL2 extend along the first direction L1 and completely overlap the corresponding scanning line SL in the vertical direction Z.

Each of the sub-pixels 22 includes at least one thin film transistor (TFT) T, a drain electrode connection pad 24 and at least one pixel electrode PE. The thin film transistor T includes a gate electrode G, a source electrode S and a drain electrode D, where the gate electrode G is connected to the corresponding scanning line SL, the source electrode S is connected to the corresponding data line DL, the drain electrode connection pad 24 is connected to the corresponding drain electrode D, and the pixel electrode PE is connected to the corresponding drain electrode connection pad 24. In this exemplary embodiment, the thin film transistor T is a bottom gate type TFT, where the gate electrode G is disposed on the first substrate 20 and covered with a gate insulating layer GI, a semiconductor layer SE is disposed on the gate insulating layer GI, and the source electrode S and the drain electrode D are disposed on the semiconductor layer SE and corresponding to two opposite sides of the gate electrode G. The scanning line SL and the gate electrode G may be the same patterned conductive layer (e.g. a first patterned metal layer, namely metal 1), but not limited thereto. The material of the gate insulating layer GI may be inorganic insulating material, organic insulating material or organic/inorganic hybrid insulating material. The material of the semiconductor layer SE may include silicon material e.g. polycrystalline silicon, single crystalline silicon, microcrystalline silicon or nanocrystalline silicon, oxide semiconductor material e.g. indium gallium zinc oxide (IGZO), indium gallium oxide (IGO), indium zinc oxide (IZO), indium tin oxide (ITO), titanium oxide (TiO), zinc oxide (ZnO), indium oxide (InO), gallium oxide (GaO), or other proper semiconductor materials. The source electrode S, the drain electrode D, the data line DL and the drain electrode connection pad 24 may be the same patterned conductive layer (e.g. a second patterned metal layer, namely metal 2), but not limited thereto. In addition, the source electrode S, the drain electrode D, the data line DL and the drain electrode connection pad 24 are covered with at least one passivation layer 26. The passivation layer 26 has at least one contact hole (or namely through hole) TH partially exposing the drain electrode connection pad 24, and the material of the passivation layer 26 may include inorganic dielectric material, organic dielectric material or organic/inorganic hybrid dielectric material. The pixel electrode PE may be disposed on the passivation layer 26, and in contact with and electrically connected to the drain electrode connection pad 24 through the contact hole TH. The material of the pixel electrode PE may include transparent conductive material such as metal oxide (e.g. indium tin oxide (ITO) or indium zinc oxide (IZO)), metal nitride, metal oxynitride, metal material, metal alloy material (e.g. a combination of metal materials or other proper conductive materials), carbon nanotube (CNT), Graphene, nanowire-based conductive material, other proper conductive material, or a multi-layered formed by at least two of the aforementioned materials. In an alternative embodiment, the thin film transistor T may be a top gate type TFT, where the semiconductor layer SE is disposed on the first substrate 20, the semiconductor layer SE is covered with the gate insulating layer GI, and the gate electrode G is disposed on the gate insulating layer GI. The location and arrangement of other components e.g. the source electrode S, the drain electrode D, the data line DL, the drain electrode connection pad 24, the passivation layer 26 and the pixel electrode PE are illustrated in the aforementioned description, which is not redundantly described. In addition, the pixel electrode PE may be a patterned electrode, which may include branch electrodes and slits, but not limited thereto. The pixel electrode PE may also be a full-surfaced electrode without slits or openings, or a combination of a patterned electrode and a full-surfaced electrode. The second substrate 30 is disposed on the first substrate 20 and opposite to the first substrate 20. The second substrate 30 may include a transparent substrate, and the material of the second substrate 30 may be the same as the first substrate 20, but not limited thereto.

The display panel 2 of this exemplary embodiment further includes a plurality of light-shielding patterns 34 extending along the first direction L1 and corresponding to the scanning lines SL respectively. Each of the light-shielding patterns 34 is disposed on one of the first substrate 20 and the second substrate 30 e.g. either on the first substrate 20 or on the second substrate 30. The light-shielding pattern 34 may include black matrix (BM), and the material of the light-shielding pattern 34 may be opaque (non-transparent) insulating material e.g. black photoresist or opaque conductive material e.g. metal, but not limited thereto. In this exemplary embodiment, the light-shielding patterns 34 are disposed on the second substrate 30, and the light-shielding patterns 34 may overlap all of the scanning lines SL, a portion of the first data segments DL1, all of the second data segments DL2, all of the thin film transistors T and all of the drain electrode connection pads 24 in the vertical direction Z. The light-shielding patterns 34 are opaque, and thus a light-shielding region is defined by the light-shielding pattern 34 where light is blocked from passing through. In addition, a light-permitting region (also referred to as an effective display region) is defined between two light-shielding patterns 34 adjacent in the second direction L2 where light is permitted to pass through. In addition, the light-shielding patterns 34 disposed in the sub-pixel 22 has a width W in the second direction L2, a distance X exists between two light-shielding patterns (or namely two neighboring light-shielding patterns) 34 adjoining to the sub-pixel 22 (or namely the same sub-pixel) in the second direction L2, and the sum of the width W and the distance X is substantially equal to a length H of the sub-pixel 22 in the second direction L2, i.e. W+X=H. In other words, the two neighboring light-shielding patterns 34 in the first direction L1 are respectively disposed at two sides of the length H of the same sub-pixel 22, the width of the light-shielding region in the second direction L2 is substantially equal to the width W of the light-shielding pattern 34, and the width of the light-permitting region in the second direction L2 is substantially equal to the distance X. In an alternative embodiment, the light-shielding patterns 34 may be disposed on the first substrate 20, and the light-shielding patterns 34 may overlap all of the scanning lines SL, a portion of the first data segments DL1, all of the second data segments DL2, all of the thin film transistors T and all of the drain electrode connection pads 24 in the vertical direction Z. Furthermore, each of the sub-pixels 22 may include a color filter layer 36 e.g. a red color filter layer, a green color filter layer or a blue color filter layer, and the color filter layer 36 is disposed on one of the first substrate 20 and the second substrate 30. For example, the color filter layer 36 is disposed on the second substrate 30 and overlaps the light-permitting region in the vertical direction Z. In an alternative embodiment, the color filter layer 36 is disposed on the first substrate 20 and overlaps the light-permitting region in the vertical direction Z. In addition, each of the sub-pixels 22 may further include a common electrode CE disposed on one of the first substrate 20 and the second substrate 30. In this exemplary embodiment, the common electrode CE is disposed on the second substrate 30. In an alternative embodiment, the common electrode CE may be disposed on the first substrate 20. The common electrode CE may be a patterned electrode, which may include branch electrodes and slits, but not limited thereto. The common electrode CE may also be a full-surfaced electrode without slits or openings. The display medium layer 32 is interposed between the first substrate 20 and the second substrate 30, and the display medium layer 32 may include a non-self-luminous display medium layer or a self-luminous display medium layer. The material of the non-self-luminous display medium layer may include, for example, positive liquid crystal material, negative liquid crystal material, blue phase liquid crystal material, electrowetting material, electrophoretic material, other proper non-self-luminous display medium materials, or a combination of at least two of the aforementioned materials. The material of the self-luminous display medium layer may include, for example, small molecular organic light-emitting material, polymer organic light-emitting material, inorganic light-emitting material, other proper self-luminous display medium materials, or a combination of at least two of the aforementioned materials. In this exemplary embodiment, a liquid crystal display panel using liquid crystal material is selected as an example, but not limited thereto.

Figure 1:
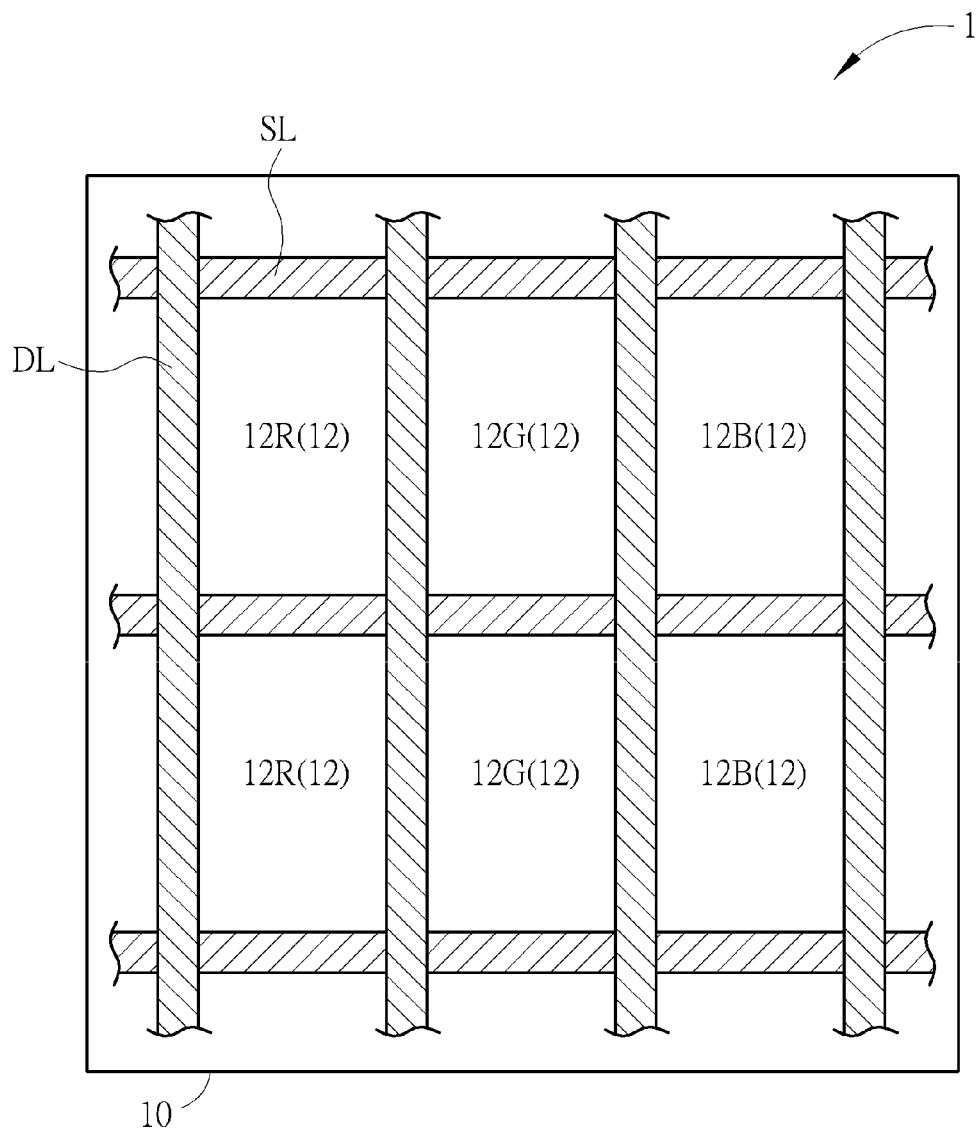
FIG. 1 is a schematic diagram illustrating a conventional display panel.

In this exemplary embodiment, each of the sub-pixels 22 of a first row 20R1 of two adjoining rows 20R is shifted by a predetermined distance K along the first direction L1 with respect to each of the sub-pixels 22 of a second row 20R2 of the two adjoining rows 20R, i.e. the sub-pixels 22 of any two adjoining rows 20R are staggeredly arranged. Compared with the conventional display panel 1 of FIG. 1, when the display panel 2 of this exemplary embodiment displays circular zone plate (CPZ) pattern, light halo phenomenon will not occur in high frequency zone, or color deviation i.e. color shift will not occur. Therefore, the display effect of the display panel 2 is superior to that of the conventional display panel 1. However, the second data segment DL2 and the scanning line SL completely overlap, and this generates high parasitic capacitance. The high parasitic capacitance adversely affects the device characteristic e.g. threshold voltage or feed through voltage of the thin film transistor T, and thus has an unfavorable impact on display quality.

The display panel is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 4:
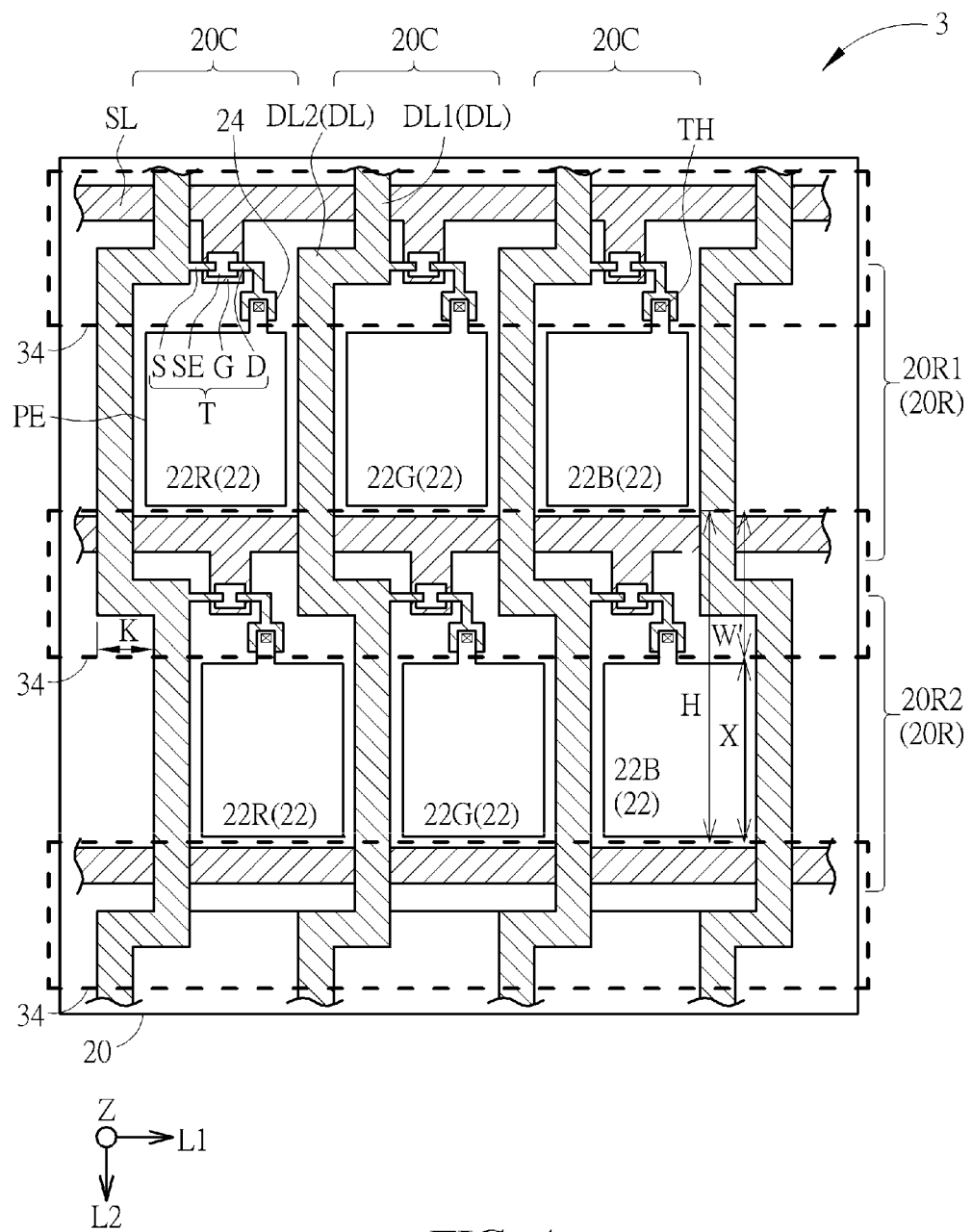
FIG. 4 is a schematic diagram illustrating a display panel according to a second exemplary embodiment.

Referring to FIG. 4, FIG. 4 is a schematic diagram illustrating a display panel according to a second exemplary embodiment. The same components in this exemplary embodiment and the first embodiment are described in the first embodiment, and thus are not redundantly described. As shown in FIG. 4, different from the first embodiment, in the display panel 3 of the second embodiment, the second data segment DL2 is disposed on one side of the corresponding scanning line SL and extends along the first direction L1, the second data segment DL2 does not overlap the scanning line SL in the vertical direction Z, and the first data segment DL1 extends along the second direction L2 and partially overlaps the scanning line SL in the vertical direction Z. Since the overlapping area of the first data segment DL1 and scanning line SL in the vertical direction Z in the second embodiment is smaller than the overlapping area of the second data segment DL2 and scanning line SL in the vertical direction Z in the first embodiment, the parasitic capacitance between the data line DL and the scanning line SL is reduced in the second embodiment. In the second embodiment, the second data segment DL2 of the data line DL, however, is shifted downwardly along the second direction L2 (or the scanning line SL is shifted upwardly along the second direction L2), the width W' of the light-shielding pattern 34 in the second direction L2 in the second embodiment is enlarged to be wider than the width W of the light-shielding pattern 34 in the second direction L2 in the first embodiment to shield all of the scanning lines SL, a portion of the first data segments DL1, all of the second data segments DL2, all of the thin film transistors T and all of the drain electrode connection pads 24. Thus, the width W' of the light-shielding region in the second embodiment is enlarged to be wider than the width W of the light-shielding region in the first embodiment, and the width of the light-shielding region of the second embodiment is greater than the width of the light-permitting region of the first embodiment. In the second embodiment, the parasitic capacitance between the data line DL and the scanning line SL is reduced because the overlapping area of the first data segment DL1 and scanning line SL in the vertical direction Z is reduced as opposed to the overlapping area of the second data segment DL2 and scanning line SL in the vertical direction Z in the first embodiment. However, the aperture ratio of the display panel 3 in the second embodiment is way lower than the aperture ratio of the display panel 2 in the first embodiment. For example, the aperture ratio of the display panel 3 in the second embodiment is at least 30% less than the aperture ratio of the display panel 2 in the first embodiment. In such a case, the brightness of the display panel 3 is lower than the brightness of the display panel 2 under the same driving voltage. In order to provide the same brightness as the display panel 2, the display panel 3 must be driven by higher driving voltage, which causes more power consumption.

Figure 5:
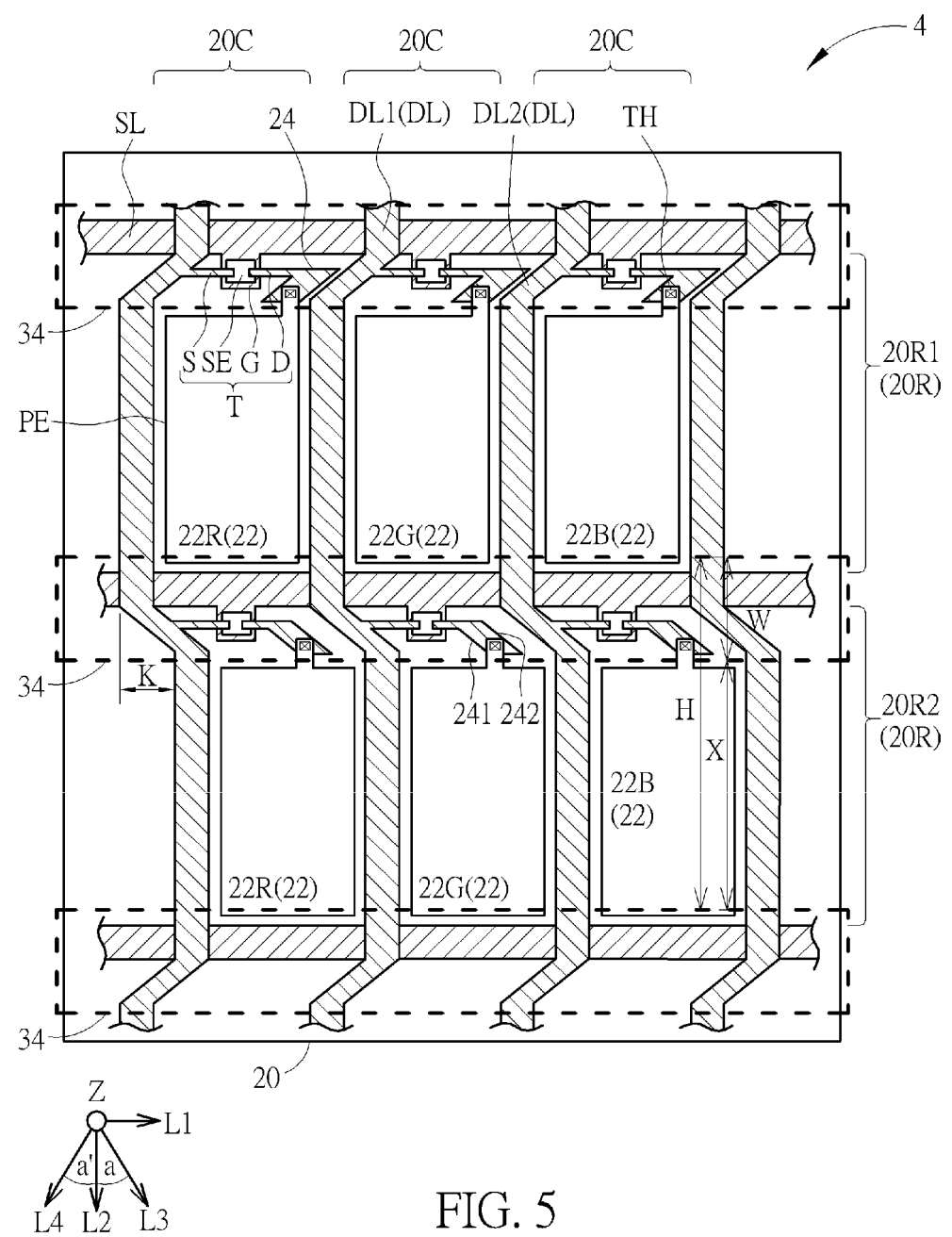
FIG. 5 is a schematic diagram illustrating a display panel according to a third exemplary embodiment.

Referring to FIG. 5, FIG. 5 is a schematic diagram illustrating a display panel according to a third exemplary embodiment. The same components in this exemplary embodiment and the first embodiment are described in the first embodiment, and thus are not redundantly described. As shown in FIG. 5, in the display panel 4 of the third embodiment, the first data segment DL1 extends along the second direction L2 and partially overlaps the corresponding scanning line SL in the vertical direction Z. Different from the first and second embodiments, in the third embodiment, each of the second segments DL2 is disposed on one side of the corresponding scanning line SL without overlapping the scanning line SL, and at least a portion of the second data segments DL2 extend along a third direction L3, where the third direction L3 is an oblique direction (or namely slant direction, or tilt direction) different from the first direction L1 and the second direction L2. Specifically, the third direction L3 and the second direction L2 have an included angle a (i.e. the included angle between the second data segment DL2 and the first data segment DL1), and the included angle a is greater than 0 degree and less than 90 degrees. The included angle a is measured by absolute value. To be exact, if the clockwise direction is defined as a positive direction, the slope of the second data segment DL2 is a negative value. In this exemplary embodiment, the included angle a is greater than 0 degree and less than +90 degrees, for example, the included angle a is substantially between +30 degrees and +60 degrees, or substantially between +30 degrees and +40 degrees, or substantially between +50 degrees and +60 degrees, or substantially between +40 degrees and +50 degrees, or substantially +45 degrees, but not limited thereto. In an alternative embodiment, if the counterclockwise direction, the slope of the second data segment DL2 is a positive value. The included angle a is less than 0 degree and greater than −90 degrees, for example, the included angle a is substantially between −30 degrees and −60 degrees, or substantially between −30 degrees and −40 degrees, or substantially between −50 degrees and −60 degrees, or substantially between −40 degrees and −50 degrees, or substantially −45 degrees, but not limited thereto. Since the second data segment DL2 extends along the third direction L3, the scanning line SL, two adjacent second data segments (or two neighbor second data segments) DL2 and one edge (or namely side) of the light-shielding pattern 34 define a region substantially having a parallelogram shape, and this parallelogram region overlaps the light-shielding pattern 34 in the vertical direction Z. In addition, to meet the design rule, two side edges 241, 242 of the drain electrode connection pad 24 are substantially parallel to the second data segment DL2. For example, the shape of the drain electrode connection pad 24 i.e. the projection shape of the drain electrode connection pad 24 is substantially a parallelogram shape. Due to the limit of photolithographic process, the actual shape of the drain electrode connection pad 24 may not be perfect parallelogram shape, but the major axis (or long axis) of the pattern of the drain electrode connection pad 24 is substantially parallel to the second data segment DL2. For example, the shape of the drain electrode connection pad 24 may be substantially an elliptic shape, a rhombus shape or other like shapes. In this exemplary embodiment, the projection shape of the contact hole TH through which the pixel electrode PE and the drain electrode connection pad 24 are connected may be any shapes such as triangle, trapezoid, quadrangle, parallelogram, circular (round), elliptic, rhombus or other similar shapes. The projection shape of the extension portion of the pixel electrode PE that extends to the top of the drain electrode connection pad 24 may also be any shapes such as triangle, trapezoid, quadrangle, parallelogram, circular (round), elliptic, rhombus or other like shapes. To meet the process and/or design requirement, the projection shapes of the through hole TH, the drain electrode connection pad 24 and the extension portion of the pixel electrode PE are preferably substantially parallelogram. In alternative embodiments, the projection shape of the drain electrode connection pad 24 may be substantially parallelogram, elliptic, rhombus or other like shapes, and the projection shape of the through hole TH may be substantially quadrangle, circular, elliptic, rhombus or other like shapes. In the third embodiment, the ratio of the width W of the light-shielding pattern 34 in the second direction L2 to the distance X between two light-shielding patterns 34 adjoining to the sub-pixel 22 in the second direction L2 (i.e. W/X) is substantially greater than 0 and less than or equal to 0.4, or substantially greater than 0.1 and less than or equal to 0.4, or substantially greater than 0.2 and less than or equal to 0.4. Specifically, though the shifting offset between the sub-pixels 22 of two adjacent rows (i.e. the predetermined distance K of each of the sub-pixels 22 of the first row 20R1 of two adjoining rows 20R shifted along the first direction L1 with respect to each of the sub-pixels 22 of the second row 20R2 of the two adjoining rows 20R) is able to avoid light halo phenomenon and color shift, the aperture ratio is reduced when W/X is greater than 0.4 and less than 1. The aperture ratio is even dramatically reduced if W/X is greater than 1. Therefore, when W/X is greater than 0 and less than or equal to 0.4, not only the display panel 4 has high aperture ratio, but light halo phenomenon and color shift can be avoided due to the shifting offset between the sub-pixels 22 of two adjacent rows reaches about half the width of the sub-pixels 22. Consequently, both the light halo phenomenon and color shift and the aperture ratio are considered.

In this exemplary embodiment, the extension direction of a portion of the second data segments DL2 may be different from the extension direction of another portion of the second data segments DL2. Specifically, a portion of the second data segments DL may extend along the third direction L3 and have an included angle a with the first data segments DL1, while another portion of the second data segments DL may extend along a fourth direction L4 and have an included angle a' with the first data segments DL1. The fourth direction L4 is different from the first direction L1, the second direction L2 and the third direction L3, and the included angle a' is substantially less than 0 degree and greater than −90 degrees. The third direction L3 and the fourth direction L4 may be symmetric with respect to the second direction L2, but not limited thereto. In this exemplary embodiment, the second data segments DL2 corresponding to the sub-pixels 22 of odd rows 22R extend along the third direction L3, and the included angle a between the second data segment DL2 and the first data segment DL1 is greater than 0 degree and less than +90 degrees, for example, the included angle a is substantially between +30 degrees and +60 degrees, or substantially between +30 degrees and +40 degrees, or substantially between +50 degrees and +60 degrees, or substantially between +40 degrees and +50 degrees, or substantially +45 degrees; the second data segments DL2 corresponding to the sub-pixels 22 of even rows 22R extend along the fourth direction L4, and the included angle a' between the second data segment DL2 and the first data segment DL1 is less than 0 degree and greater than −90 degrees, for example, the included angle a' is substantially between −30 degrees and −60 degrees, or substantially between −30 degrees and −40 degrees, or substantially between −50 degrees and −60 degrees, or substantially between −40 degrees and −50 degrees, or substantially −45 degrees, but not limited thereto. In an alternative embodiment, the second data segments DL2 corresponding to the sub-pixels 22 of the first row, the second row, the fifth row, the sixth row . . . , the $4P-3^{th}$ row and the $4P-2^{th}$ row extend along the third direction L3, while the second data segments DL2 corresponding to the sub-pixels 22 of the third row, the fourth row, the seventh row, the eighth row . . . , the $4P-1^{th}$ row and the $4P^{th}$ row extend along the fourth direction L4, where P is a positive integer greater than 0.

Since the overlapping area of the first data segment DL1 and scanning line SL in the vertical direction Z in the third embodiment is smaller than the overlapping area of the second data segment DL2 and the scanning line SL in the vertical direction Z in the first embodiment, the parasitic capacitance between the data line DL and scanning line SL is reduced, which diminishes the adverse impact on the device characteristic e.g. threshold voltage or feed through voltage of the thin film transistor T. Thus, the display quality of the display panel 4 of the third embodiment is superior. In addition, the second data segments DL2 extend along the third direction L3, and thus the width W of the light-shielding pattern 34 in the second direction L2 is enough to shield all of the scanning lines SL, a portion of the first data segments DL1, all of the second data segments DL2, all of the thin film transistors T and all of the drain electrode connection pads 24 without requiring being enlarged. In other words, the width W of the light-shielding pattern 34 in the second direction L2 of the third embodiment may be substantially equal to or less than the width W of the light-shielding pattern 34 in the second direction L2 of the first embodiment or less than the width W' of the light-shielding pattern 34 in the second direction L2 of the second embodiment. Consequently, the aperture ratio in the third embodiment is not sacrificed (lost), or even increased. Thus, the display panel 4 of the third embodiment is the most preferred embodiment as opposed to the display panel 2 of the first embodiment and the display panel 3 of the second embodiment.

In conclusion, the shifting offset between the sub-pixels of two adjacent rows is able to avoid light halo phenomenon when displaying high frequency zone of circular zone plate (CPZ) pattern and/or avoid color deviation (color shift) problem. In addition, the obliquely-disposed second data segment is able to reduce the parasitic capacitance between the data line and the scanning line while the aperture ratio is unaffected or even increased. Accordingly, the display quality is improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display panel comprising:
a first substrate;
a plurality of sub-pixels disposed on the first substrate and arranged in an array having a plurality of rows and columns, the sub-pixels of each of the rows being arranged in a first direction, and the sub-pixels of each of the columns being arranged in a second direction, wherein the first direction and the second direction substantially intersect, and each of the sub-pixels of a first row of two adjoining rows is shifted by a predetermined distance along the first direction with respect to each of the sub-pixels of a second row of the two adjoining rows;
a plurality of scanning lines disposed on the first substrate, wherein the scanning lines extend along the first direction and are disposed corresponding to the sub-pixels of the rows respectively;
a plurality of data lines disposed on the first substrate and corresponding to the sub-pixels of the columns respectively, wherein the data lines and the scanning lines intersect, each of the data lines comprises a plurality of first data segments and a plurality of second data segments, each first data segment and each second data segment being alternately connected to one another, the first data segments extend along the second direction and partially overlap the scanning lines in a vertical direction, each of the second data segments is disposed on one side of one corresponding scanning line, at least a portion of the second data segments extend along a third direction different from the first direction and the second direction, the third direction and the second direction have an included angle greater than 0 degree and less than 90 degrees;
a second substrate disposed on the first substrate; and
a display medium layer interposed between the first substrate and the second substrate.

2. The display panel of claim 1, wherein each of the sub-pixels comprises at least one thin film transistor, a drain electrode connection pad and at least one pixel electrode, the thin film transistor includes a gate electrode, a source electrode and a drain electrode, the gate electrode is connected to the scanning line, the source electrode is connected to the data line, the drain electrode connection pad is connected to the drain electrode, and the pixel electrode is connected to the drain electrode connection pad.

3. The display panel of claim 2, further comprising a plurality of light-shielding patterns extending along the first direction and corresponding to the scanning lines, wherein each of the light-shielding patterns is disposed on one of the first substrate and the second substrate.

4. The display panel of claim 3, wherein the light-shielding patterns are further corresponding to the second data segments and the drain electrode connection pads, and each of the light-shielding patterns overlap the corresponding scanning line, the corresponding second data segments and the corresponding drain electrode connection pads in the vertical direction.

5. The display panel of claim 4, wherein the light-shielding pattern disposed in the sub-pixel has a width in the second direction, a distance exists between two light-shielding patterns adjoining to the sub-pixel in the second direction, and a ratio of the width to the distance is substantially greater than 0 and less than or equal to 0.4.

6. The display panel of claim 5, wherein a sum of the width and the distance is substantially equal to a length of the sub-pixel in the second direction.

7. The display panel of claim 2, wherein each of the drain electrode connection pads has two side edges substantially parallel to the second data segment.

8. The display panel of claim 7, wherein each of the drain electrode connection pads has a parallelogram shape.

9. The display panel of claim 7, wherein each of the drain electrode connection pads has an elliptic shape.

10. The display panel of claim 1, wherein the predetermined distance is less than a width of the sub-pixel in the first direction.

11. The display panel of claim 1, wherein the predetermined distance is greater than 0 and less than or equal to half of a width of the sub-pixel in the first direction.

12. The display panel of claim 1, wherein each of the sub-pixels comprises a color filter layer disposed on one of the first substrate and the second substrate.

13. The display panel of claim 1, wherein the second data segments do not overlap the scanning lines in the vertical direction.

14. The display panel of claim 1, wherein a portion of the second data segments extend along the third direction, another portion of the second data segments extend along a fourth direction different from the first direction, the second direction and the third direction, and the fourth direction and the second direction have another included angle less than 0 degree and greater than −90 degrees.

* * * * *